United States Patent
Chae et al.

(10) Patent No.: US 9,593,183 B2
(45) Date of Patent: Mar. 14, 2017

(54) PREPARATION METHOD OF CATALYST FOR POLYMERIZATION OF POLYOLEFIN AND PROCESS FOR POLYMERIZATION OF POLYOLEFIN USING THE SAME

(71) Applicant: LOTTE CHEMICAL CORPORATION, Seoul (KR)

(72) Inventors: Byung Hun Chae, Daejeon (KR); Seong Soo Lim, Daejeon (KR); Cheon Ik Joo, Daejeon (KR); Jung Yeop Lee, Daejeon (KR); Sook Young Jin, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 342 days.

(21) Appl. No.: 14/360,507

(22) PCT Filed: Nov. 1, 2013

(86) PCT No.: PCT/KR2013/009855
§ 371 (c)(1),
(2) Date: May 23, 2014

(87) PCT Pub. No.: WO2014/081132
PCT Pub. Date: May 30, 2014

(65) Prior Publication Data
US 2016/0075802 A1 Mar. 17, 2016

(30) Foreign Application Priority Data
Nov. 23, 2012 (KR) ........................ 10-2012-0133861

(51) Int. Cl.
*C08F 110/06* (2006.01)
(52) U.S. Cl.
CPC ................................ *C08F 110/06* (2013.01)

(58) Field of Classification Search
CPC .............................. C08F 110/06; C08F 10/00
See application file for complete search history.

(56) References Cited

U.S. PATENT DOCUMENTS

| 5,037,910 A | 8/1991 | Cook et al. |
| 2004/0054101 A1 | 3/2004 | Saudemont et al. |

(Continued)

FOREIGN PATENT DOCUMENTS

| CN | 1169845 | 10/2004 |
| CN | 1636023 | 7/2005 |

(Continued)

OTHER PUBLICATIONS

Written Opinion for International Application No. PCT/KR2013/009855 dated Feb. 2, 2014.

(Continued)

*Primary Examiner* — Catherine S Branch
(74) *Attorney, Agent, or Firm* — Alston & Bird LLP

(57) ABSTRACT

This disclosure relates to a method for preparing a catalyst for synthesis of a polyolefin and a process for synthesis of a polyolefin using the same. More particularly, this disclosure relates to a method for preparing a catalyst for synthesis of a polyolefin including: reacting a magnesium compound with an alkane diol having a carbon number of 3 to 15 unsubstituted or substituted with an alkyl group having a carbon number of 1 to 5, and a benzoyl halide compound to prepare a magnesium compound solution; reacting the magnesium compound solution with a first transition metal compound to prepare a support; and reacting the support with a second transition metal compound to produce a solid catalyst, and a process for synthesis of a polyolefin using the same.

15 Claims, 1 Drawing Sheet

(56) References Cited

U.S. PATENT DOCUMENTS

2012/0184694 A1    7/2012  Xia et al.
2013/0116393 A1*   5/2013  Haikarainen ........... C08F 10/00
                                                      526/124.2

FOREIGN PATENT DOCUMENTS

| CN | 1935858 | 3/2007 |
|---|---|---|
| CN | 102741298 | 10/2012 |
| CN | 102741299 | 10/2012 |
| CN | 102741300 | 10/2012 |
| EP | 0496740 | 8/1992 |
| EP | 2 562 189 | 2/2013 |
| JP | 53-019395 A | 2/1978 |
| JP | 7-91336 | 10/1995 |
| JP | 2012-532896 A | 12/2012 |
| KR | 2003-0064739 A | 8/2003 |
| KR | 10-2010-0130233 | 12/2010 |
| KR | 10-2011-0078058 | 7/2011 |
| WO | WO 91/05811 A1 | 5/1991 |
| WO | WO 03/068828 A1 | 8/2003 |

OTHER PUBLICATIONS

International Search Report from International Application No. PCT/KR2013/009855, mailed Feb. 6, 2014.
Extended European Search Report for corresponding European Application No. 13848113.0 dated Sep. 7, 2016, 6 pages.
Office Action for corresponding Chinese Application No. 201380006562.0 dated Jun. 17, 2016.

* cited by examiner

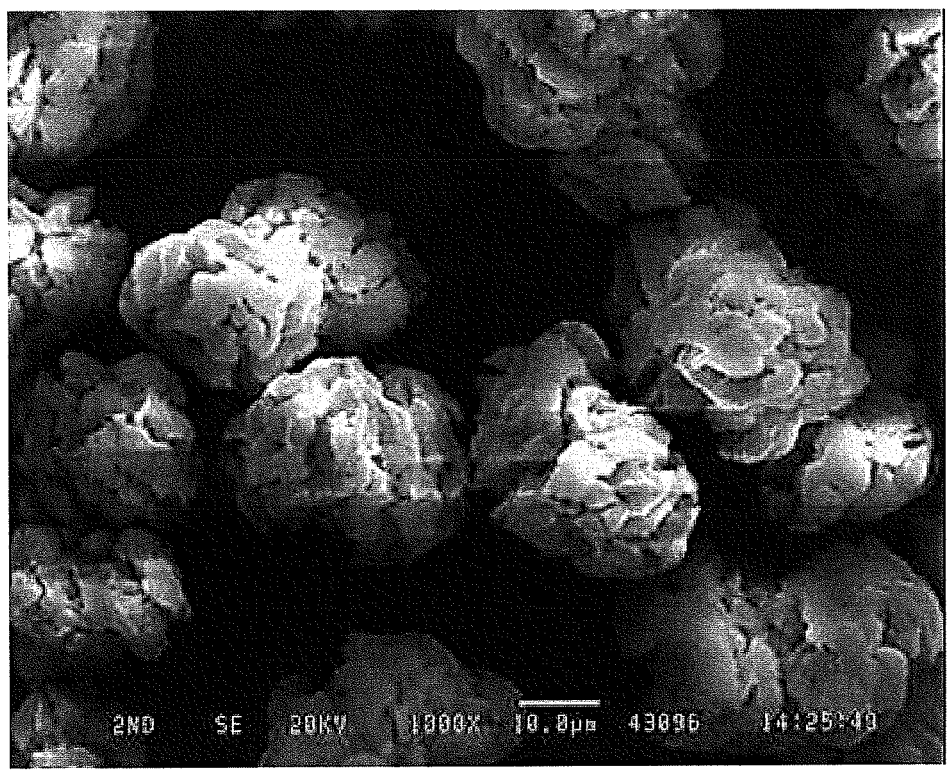

PREPARATION METHOD OF CATALYST FOR POLYMERIZATION OF POLYOLEFIN AND PROCESS FOR POLYMERIZATION OF POLYOLEFIN USING THE SAME

TECHNICAL FIELD

The present invention relates to a method for preparing a catalyst for synthesis of a polyolefin, and a process for synthesis of a polyolefin using the same. More particularly, the present invention relates to a method for preparing a catalyst for synthesis of a polyolefin, which may exhibit high reactivity in the synthesis reaction of the polyolefin, and may easily control the properties of a synthesized polyolefin such as molecular weight distribution, mechanical properties, and the like, and a process for preparation of a polyolefin using the same.

BACKGROUND OF ART

In the preparation of a polyolefin by polymerization of an olefin, a catalyst is used for efficient olefin polymerization, and specifically, various catalysts such as a Zeigler-Natta catalyst, a chromium-based catalyst, a metallocene catalyst, and the like are used according to the kind of central metals. Since these catalysts have different catalytic activities and the polyolefins prepared using the same have different molecular weight distributions, stereoregularities, and co-monomer reaction properties, the catalysts are selectively used according to each preparation process and applied product.

In general, a catalyst for synthesis of an olefin, called a Zeigler-Natta catalyst, refers to a solid catalyst consisting of a main catalyst that is a main component, a cocatalyst that is an organic metal compound, and an electron donor, it has been widely studied to improve polymerization activity and stereoregularity, and many related technologies have been suggested.

Specifically, WO2003-068828 discloses a method of changing stereoregularity of polypropylene by applying various internal electron donors. However, since a process of synthesizing an internal electron donor is complicated and difficult to commercially apply, it is disadvantageous.

A Zeigler-Natta catalyst directly influences the characteristics and properties of a produced polyolefin according to the components, structure, preparation method, and the like. Thus, in order to change the properties of a produced polyolefin, changes in the components of a catalyst, the structure of a support, and the preparation method of a catalyst and the like should be involved in the preparation of a catalyst. Further, studies on the activity of the catalyst, and the molecular weight and the stereoregularity of the produced polymer, which are changed due to the preparation method or components of each catalyst and the like, should be combined.

Particularly, among polyolefin resins, polypropylene resin has excellent stiffness and chemical resistance and thus is widely used as interior parts for automobiles, components for electric home appliance, and the like. However, when the polypropylene resin is used as interior parts of automobiles or materials of injection molded products for general packaging, it does not have good transparency and thus has inferior formability, and does not have good flexural modulus and heat deflection temperature and thus there are many limitations in using them.

Accordingly, there is an increasing demand for the development of a Zeigler-Nana catalyst for synthesis of polyolefins, which can improve formability such as transparency and heat deflection temperature as well as basic properties such as apparent density and stereoregularity, while maintaining high polymerization activity.

PRIOR ART DOCUMENTS

Patent (Patent 1) WO 2003-068828

DETAILED DESCRIPTION OF THE INVENTION

Technical Problem

It is an object of the present invention to provide a method for preparing a catalyst for synthesis of polyolefins that may exhibit high reactivity in the synthesis reaction of polyolefins, and easily control the properties of synthesized polyolefins such as molecular weight distribution, mechanical properties, and the like.

It is another object of the present invention to provide a process for preparation of polyolefins using the catalyst for polymerization of polyolefins.

Technical Solution

The present invention provides a method for preparing a catalyst for synthesis of polyolefins including: reacting a magnesium compound with an alkane diol having a carbon number of 3 to 15, unsubstituted or substituted with an alkyl group having a carbon number of 1 to 5, and a benzoyl halide compound to prepare a magnesium compound solution; reacting the magnesium compound solution with a first transition metal compound to prepare a support; and reacting the support with a second transition metal compound to produce a solid catalyst.

The present invention also provides a process for synthesis of polyolefin including reacting olefin monomers in the presence of the catalyst for polymerization of polyolefins prepared by the above method.

Hereinafter, a method for preparing a catalyst for synthesis of polyolefins, and a process for synthesis of polyolefins using the same, will be explained in detail.

According to one embodiment of the invention, a method for preparing a catalyst for polymerization of polyolefin is provided.

The inventors recognized that when the existing polypropylene is used as the material for automobile parts and molded products for general packaging, it does not have good transparency and hardness and the like, and thus the use thereof is limited despite other physical advantages, and conducted studies on a method for preparing a catalyst for synthesis of polypropylene that can replace the same. As a result, it was confirmed through experiments that a solid catalyst that is prepared by forming a support using a magnesium compound including a specific alkane diol and benzoyl halide and immobilizing a transition metal compound thereon has high activity, and yet may easily control the properties of a prepared polyolefin resin such as transparency, molecular weight distribution, mechanical properties, and the like, and the invention was completed.

Particularly, according to the above preparation method, a catalyst that has a specific shape and size, and yet has excellent physical properties such as excellent reaction activity, high heat deflection temperature, and the like may be easily prepared.

The synthesis of a polyolefin includes a polymerization process using one kind of olefin monomers, and a copolymerization process using two or more kinds of monomers.

According to one embodiment of the invention, there is provided a method for preparing a catalyst for synthesis of polyolefins including: reacting a magnesium compound with an alkane diol having a carbon number of 3 to 15 unsubstituted or substituted with an alkyl group having a carbon number of 1 to 5, and a benzoyl halide compound to prepare a magnesium compound solution; reacting the magnesium compound solution with a first transition metal compound to prepare a support; and reacting the support with a second transition metal compound to produce a solid catalyst.

The first and second transition metal compounds include a transition metal of Group IVB, VB, or VIB, and organic compounds containing the transition metal, and specific examples of the transition metal may include Ti, Zr, Hf, Rf, V, Nb, Ta, Db, Cr, Mo, W, and Sg.

The first transition metal compound is reacted with a magnesium compound to form a support, and the second transition metal compounds is immobilized on the support to form the active sites of a catalyst. The terms "first" and "second" are used to distinguish transition metal compounds, but do not limit the reaction sequence or adding sequence, or the kind of the transition metal compounds. Further, the first transition metal compound and the second transition metal may be the same or different.

As the transition metal compound, any transition metal compounds known to be used as a Zeigler-Natta catalyst for synthesis of polyolefins may be used in the preparation of the catalyst component without limitations. Particularly, preferable examples of the transition metal compound may include the compound of the following Chemical Formula 1.

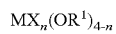   [Chemical Formula 1]

In Chemical Formula 1, M is selected from the group consisting of transition metal atoms of Group IVB, VB, and VIB in the periodic table, X is a halogen, $R^1$ is an alkyl group having a carbon number of 1 to 10, and n denotes an oxidation number of a metal and is 0 to 4.

Preferable examples of the M may include Ti, Zr, Hf, Rf, V, Nb, Ta, Db, Cr, Mo, W, and Sg. Specific examples of the transition metal compound of Chemical Formula 1 may include titanium tetrachloride, titanium tetrabromide, titanium tetraiodide, tetrabutoxy titanium, tetraethoxy titanium, diethoxy titanium dichloride, ethoxy titanium trichloride, and the like, and titanium tetrachloride is preferably used.

Specific examples of the magnesium compound may include magnesium halide, dialkoxy magnesium, alkylmagnesium halide, alkoxymagnesium halide, and aryloxymagnesium halide, and the like, and magnesium halide is more preferably used because it increases the activity of a catalyst.

Specifically, the magnesium halide compound is a compound that does not have reductivity, and may include magnesium chloride, magnesium dichloride, magnesium fluoride, magnesium bromide, magnesium iodide, phenoxy magnesium chloride, isopropoxy magnesium chloride, butoxy magnesium chloride, and the like, and magnesium dichloride is preferably used because it is structurally and coordinately stable with a transition metal compound that is a main active metal, and exhibits high activity.

The benzoyl halide compound that is added in the step of preparing the magnesium solution may perform a function as a precipitation accelerator, and thus accelerate precipitation of a catalyst. Further, it may cause a reaction with an alkane diol compound to perform a function as an internal electron donor, and it may control the active sites of a catalyst to increase the yield of the prepared catalyst. Specific examples of the benzoyl halide compound may include benzoyl chloride, benzoyl fluoride, benzoyl bromide, and the like, and benzoyl chloride is preferable.

In the step of preparing the magnesium solution, the magnesium compound and the benzoyl halide compound may react at a molar ratio of 1:0.03 to 1:3, preferably 1:1 to 1:2. If the molar ratio does not fall within the above range, precipitation does not easily occur, and thus the shape of a catalyst particle may become irregular, and a catalyst having low activity and stereoregularity may be prepared.

In the step of preparing the magnesium solution, the alkane diol having a carbon number of 3 to 15 unsubstituted or substituted with an alkyl group having a carbon number of 1 to 5 may react with a magnesium compound and a benzoyl halide compound.

The alkane diol having a carbon number of 3 to 15 unsubstituted or substituted with an alkyl group having a carbon number of 1 to 5 refers to an alkane having a carbon number of 3 to 15 that is substituted with two hydroxy groups (—OH), and it may be unsubstituted or substituted with an alkyl group having a carbon number of 1 to 5. Since the alkane diol dissolves a magnesium compound, if the introduction amount of alkane diol is small, a magnesium compound may not be completely dissolved. Specifically, 2,4-pentanediol, 3-methyl-2,4-pentanediol, 3-ethyl-2,4-pentanediol, or 1,4-butanediol may be preferably used because they have high solubility and reaction occurs well.

The reaction molar ratio of the magnesium compound and the alkane diol having a carbon number of 3 to 15 unsubstituted or substituted with an alkyl group having a carbon number of 1 to 5 may be 1:1 to 1:10, preferably 1:2 to 1:6. If the reaction molar ratio of the alkane diol to the magnesium compound is greater than 10 moles, the amount of a transition metal compound that reacts with the magnesium compound should be increased so as to exhibit high activity, and thus it is not preferably in terms of economical efficiency, and if it is less than 1 mole, a magnesium compound solution may not be prepared as a homogeneous solution, and thus it is not preferable for growth of a catalyst.

The benzoyl halide compound and the alkane diol may be simultaneously introduced when a catalyst is prepared, the alkane diol dissolves the magnesium compound and the benzoyl halide compound precipitates catalyst particles, and thus homogeneous catalyst particles having a regular shape may be formed with high yield. Further, the two compounds may perform a function as an internal electron donor, and thus polypropylene resin having excellent stereoregularity may be obtained.

In the step of reacting the magnesium compound with the alkane diol having a carbon number of 3 to 15 unsubstituted or substituted with an alkyl group having a carbon number of 1 to 5 and a benzoyl halide compound to prepare a magnesium solution, the reaction sequence or introduction sequence of the reactants is not specifically limited, and for example, the magnesium compound and the alkane diol and the compound of Chemical Formula 1 may be simultaneously reacted, or the above components may be sequentially introduced and reacted.

However, in order to efficiently prepare a homogeneous magnesium solution, it is preferable that the magnesium compound is dissolved in the alkane diol, and then the benzoyl halide compound is added and reacted.

The step of preparing the magnesium solution may be conducted at a temperature of 70 to 150° C. That is, the temperature for dissolving the magnesium compound in the alkane diol is preferably 70 to 150° C., and if the temperature does not fall within the above range, the magnesium compound may not be properly dissolved in the alkane diol, or side reactions may be increased.

After dissolving the magnesium compound in the alkane diol, the reaction mixture may be sufficiently stirred so as to disperse the whole solution, and the benzoyl halide compound may be added to the product of the magnesium compound completely dissolved in the alkane diol and reacted.

The step of preparing the magnesium solution may be conducted in the presence of a hydrocarbon solvent. If they are reacted in the presence of a hydrocarbon solvent, a homogeneous solution of a magnesium compound and alkane diol may be obtained even with a small amount of alkane diol.

Specific examples of the hydrocarbon solvent may include aliphatic or cycloaliphatic hydrocarbons having a carbon number of 5 to 20, and among them, aliphatic or cycloaliphatic hydrocarbon solvents having a carbon number of 6 to 17 are preferable. More specific examples may include aliphatic hydrocarbons such as hexane, heptane, octane, decane, dodecane, tetradecane, mineral oil, and the like; cycloaliphatic hydrocarbons such as cyclic hexane, cyclic octane, methyl cyclic pentane, methyl cyclic hexane, and the like; and aromatic hydrocarbons such as benzene, toluene, xylene, ethylbenzene, cumene, and the like. It is preferable that the hydrocarbon solvent is reacted at a ratio of 0.2 to 2 moles per 1 mole of alkane diol having a carbon number of 3 to 15 unsubstituted or substituted with an alkyl group having a carbon number of 1 to 5. If the amount of the hydrocarbon solvent is less than the above range, it may be difficult to obtain a homogeneous magnesium halide compound solution at a low temperature, and if the amount is greater than the above range, the reactor capacity may become large, and it may be difficult to control the temperature.

After the step of preparing the magnesium solution, the magnesium compound solution and the first transition metal compound are reacted to prepare a support.

The first transition metal compound may be dispersed in a hydrocarbon solvent and reacted. This is to control the molar ratio of hydrocarbon, and prepare a solid-type catalyst having a uniform particle size and a smooth surface. The hydrocarbon is mixed in the amount of 0.1 to 10 moles, more preferably 0.2 to 3 moles per 1 mole of the magnesium compound, so as to prepare a solid catalyst for synthesis of polyolefins having uniform particle size distribution and a smooth catalyst particle surface.

Specific examples of the hydrocarbon solvent may include aliphatic or cycloaliphatic hydrocarbons having a carbon number of 5 to 20, and among them, aliphatic or cycloaliphatic hydrocarbon solvents having a carbon number of 5 to 14 are preferable. More specific examples may include aliphatic hydrocarbons such as hexane, heptane, octane, decane, dodecane, tetradecane, mineral oil, and the like; cycloaliphatic hydrocarbons such as cyclic hexane, cyclic octane, methyl cyclic pentane, methyl cyclic hexane, and the like; and aromatic hydrocarbons such as benzene, toluene, xylene, ethylbenzene, cumene, and the like. It is preferable that two or more kinds of hydrocarbon solvents are used in combination, and hexane and heptane are more preferably used so that the catalyst particle surface may have a smooth spherical shape.

The step of dispersing the first transition metal compound in a hydrocarbon solvent and reacting it with a magnesium compound solution may be conducted at a temperature of −50 to 20° C. If the first transition metal compound is directly reacted with the magnesium compound solution, the reaction may rapidly progress, and thus the particle size of the produced support may not be uniform and the surface may not be smooth. Thus, it is preferable that the first transition metal compound is dispersed in a hydrocarbon solvent and reacted with the magnesium compound solution. Further, in order to sufficiently disperse the first transition metal compound in a hydrocarbon solvent, a stirrer may be used. If the reaction temperature does not fall within the above range, the uniformity of the particle size of the produced support may be lowered, and thus it is not preferable.

Particularly, in order to form a catalyst having a uniform particle size, the reaction may be progressed as follows. First, a hydrocarbon solvent and a first transition metal compound are dispersed, a magnesium compound solution is added at a low temperature of −30 to −10° C., and the solution is aged for 30 minutes to 2 hours.

The step of preparing a support may further include a step of heating, after aging the solution obtained by the reaction of the magnesium compound solution and the first transition metal compound. The heating process may preferably include repeatedly conducting a temperature increasing process wherein the temperature is gradually increased so as to inhibit the production of nonuniform catalyst particles due to an extreme reaction when initial catalyst particles are produced, and an aging process. Specifically, it is preferable that after the aging process, the temperature of the reactant is increased to 20° C. at a temperature increasing speed of about 0.25° C./minute, and the reactant is maintained (aged) at 20° C. for about 30 minutes to 1 hour, and then the temperature is increased at a speed of 1° C./minute. The maximum temperature is varied according to the kind of hydrocarbon used, and if hexane is used as a hydrocarbon solvent, it is preferable to increase the temperature to 74° C.

After the reaction of the first transition metal compound and the magnesium compound solution is completed, in order to remove unreacted substances and the reaction residue, the solution may be washed with the above-explained aromatic hydrocarbon and aliphatic or cycloaliphatic hydrocarbon solvents to obtain a support. More specifically, it is preferable to wash with toluene as an aromatic hydrocarbon, and with hexane as an aliphatic or cycloaliphatic hydrocarbon.

Further, the support may be reacted with the second transition metal compound to prepare a solid catalyst, thus preparing a catalyst for synthesis of polyolefins.

Meanwhile, the method for preparing a catalyst for synthesis of polyolefins may further include steps of adding an electron donor in each preparation step. For example, in the step of preparing a magnesium compound solution, an electron donor may be added to the reactant to form a magnesium compound solution; in the step of preparing a support, an electron donor may be added to form a reaction product including the electron donor and the support; and in the step of forming a solid catalyst, an electron donor may be added to form a solid catalyst including a support on which the second metal compound is immobilized, and an electron donor.

The electron donor is not specifically limited as long as it is known to be used in a catalyst for synthesis of polyolefins, and phthalate compounds, carboxylic acid ester compounds, diether compounds, or compounds represented by the following Chemical Formula 2 are preferable.

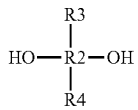
[Chemical Formula 2]

In Chemical Formula 2, R2 is a linear or branched alkyl having a carbon number of 1 to 20; R3 and R4 may be the same or different, and are respectively hydrogen or a linear or branched alkyl having a carbon number of 1 to 20, alkenyl, cycloalkyl, aryl, an aryl substituent, alkylaryl, an alkylaryl substituent, or an alkylaryl including N, O, S, or P.

The cycloalkyl group refers to a monovalent functional group derived from cycloalkane, and the aryl group refers to a monovalent functional group derived from an arene. Further, the alkylaryl group refers to an aryl group substituted with an alkyl group.

The catalyst for synthesis of polyolefins may further include the electron donor to improve stereoregularity of a polyolefin synthesized in the polyolefin polymerization reaction. The magnesium compound and the electron donor may be reacted at a molar ratio of 1:0.01 to 1:2, preferably at a molar ratio of 1:0.01 to 1:1. If the molar ratio does not fall within the above range, the uniformity of the active sites of the finally obtained catalyst for synthesis of polyolefin may be lowered, and thus it is not preferable.

In the step of reacting the support with a second transition metal compound, and optionally an electron donor, the reaction sequence or introduction sequence of the reactants is not specifically limited. For example, the support and the second transition metal compound may be reacted, or the support, the second transition metal compound, and the electron donor may be sequentially introduced and reacted.

However, in order to prepare a catalyst that has excellent catalytic activity, and to prepare a polyolefin having improved stereoregularity and uniform particle size, the reaction may be progressed as follows. The temperature of the support is increased to 80 to 130° C. at a speed of 1° C./minute, the electron donor is then introduced and reacted, and the second transition metal compound is slowly introduced and reacted at the same temperature range. Between the steps of introducing the compounds, an aging step may be conducted at the introduction temperature for 30 minutes to 2 hours.

The step of reacting the solid support with the second transition metal compound and the electron donor may be repeated two or more times. This may increase the uniformity of the active sites of a prepared catalyst, thus increasing the activity of the catalyst. Preferably, the reaction may be repeated 2 to 5 times, and if the reaction is repeated more than 5 times, the process may become complicated and the preparation cost may be increased, and thus it is not preferable.

After reacting the support with the second transition metal compound and the electron donor, the catalyst is washed with the above-explained aromatic hydrocarbon solvent at a temperature of 100° C. or less several times, and washed with an aliphatic or cycloaliphatic hydrocarbon solvent at a temperature below the boiling point of the hydrocarbon solvent, thus preparing a final solid catalyst. The aromatic hydrocarbon solvent that is used for washing is not specifically limited, but toluene is preferable, and the aliphatic or cycloaliphatic hydrocarbon solvent is not specifically limited but hexane is preferably used.

In order to obtain catalyst particles existing in the form of a slurry in a hydrocarbon solvent, the process of sinking solid catalyst particles and then removing the supernatant is repeated several times. Subsequently, the catalyst particles are ventilated in flowing nitrogen for 4 hours or more, and then dried to obtain desired catalyst particles.

According to the above preparation method, a solid catalyst for polymerization of polyolefins with high activity may be prepared by a relatively simple method, and since the prepared solid catalyst for polymerization of polyolefins has a spherical shape and a particle size in the range of 10 to 50 μm, when used for synthesis of a polyolefin, a polyolefin having high activity and high apparent density may be prepared. Further, since the catalyst is prepared in a spherical form, transfer problems may be reduced in the polymerization process of the polyolefin.

The polyolefin synthesized using the solid catalyst that is prepared according to the present invention may have an apparent density of 0.40 g/ml or more, and specifically 0.45 to 0.50 g/ml.

According to another embodiment of the invention, there is provided a process for synthesis of polyolefins including reacting olefin monomers in the presence of the catalyst prepared using the above method for preparing a catalyst for synthesis of polyolefins.

Polyolefins may be synthesized in the presence of the catalyst prepared using the above method for preparing a catalyst for synthesis of polyolefins, and polyolefins may be synthesized in the presence of a catalyst system including a cocatalyst or external electron donor in addition to the above catalyst. The polyolefin synthesized using the solid catalyst or catalyst system has improved physical properties such as apparent density and the like.

The olefin monomer may be ethylene, propylene, 1-butene, 1-pentene, 4-methyl-1-pentent, 1-hexene, 1-heptene, 1-octene, 1-decene, 1-undecene, 1-dodecene, 1-tetradecene, 1-hexadecene, 1-eicosens, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, or a mixture thereof.

In the synthesis process of a polyolefin, an external electron donor may be further included. Since the cocatalyst may reduce a transition metal compound to form active sites, it may increase catalytic activity. The cocatalyst is not specifically limited, and any organic metal compounds known to be used in the preparation of a catalyst for synthesis of polyolefins may be used without limitations. Among them, an alkyl aluminum compound represented by the following Chemical Formula 3 is preferably used.

 [Chemical Formula 3]

In Chemical Formula 3, $R^3$ is an alkyl group having a carbon number of 1 to 8, X is a halogen, and n is 0 to 3.

Specific examples of the cocatalyst may include trimethylaluminum, triethylaluminum, triisobutylaluminum, tributylaluminum, diethylaluminumdichloride, ethylaluminumdichloride, ethylaluminumsesquichloride, tripropylaluminum, tributylaluminum, tripentylaluminum, trihexylaluminum, trioctylaluminum, and the like.

The process for preparing polyolefins may be progressed while further including an external electron donor. In the catalyst for synthesis of polyolefins, a transition metal compound is reduced to remove a part of an internal electron donor, and the external electron donor binds to the empty space to progress a synthesis reaction.

The external electron donor is not specifically limited as long as it is commonly used in the synthesis of polyolefins, and among them, silane-based compounds represented by the following Chemical Formula 4 are preferably used.

$$R^4{}_nSi(OR^5)_{4-n}$$ [Chemical Formula 4]

In Chemical Formula 4, $R^4$ and $R^5$ are respectively hydrogen, a linear or branched or cyclic alkyl group having a carbon number of 1 to 10, a cycloalkyl group having a carbon number of 3 to 10, an aryl group having a carbon number of 6 to 20, an aminoalkyl group having a carbon number of 1 to 10, or an alkoxyalkyl group having a carbon number of 2 to 10.

Specific examples of the external electron donor may include cyclic hexylmethyldimethoxysilane, dicyclic pentyldimethoxysilane, diisopropyl dimethoxysilane, vinyltriethoxysilane, triethylmethoxysilane, trimethylethoxysilane, dicylcopentyldiethoxysilane, ethyltrimethoxysilane, ethyltriethoxysilane, diphenyldiethoxysilane, phenylpropyldimethoxysilane, phenyltrimethoxysilane, tertiarybutyltrimethoxysilane, cyclic hexylethyldimethoxysilane, cyclic hexylmethyldimethoxysilane, cyclic pentyltriethoxysilane, diisobutyldiethoxysilane, isobutyltriethoxysilane, normal propyltrimethoxysilane, isopropyltrimethoxysilane, cyclic heptylmethyldiethoxysilane, dicycloheptyldiethoxysilane, and the like.

The synthesis reaction may be conducted in a gas phase, a liquid phase, or a solution phase. When the synthesis reaction is conducted in a liquid phase, a hydrocarbon solvent may be used, and the olefin itself may be used as a solvent. The synthesis temperature may be 0 to 200° C., preferably 50 to 150° C. If the synthesis temperature is less than 0° C., catalytic activity may not be good, and if it is greater than 200° C., stereoregularity may be lowered. The synthesis pressure may be 1 to 100 atm, preferably 2 to 30 atm. If the synthesis pressure is greater than 100 atm, it is not preferable in terms of industrial and economical efficiency. The synthesis reaction may be conducted in a batch type, a semi-continuous type, or a continuous type.

To the polyolefin that is prepared using the solid catalyst prepared by the above method, a commonly added heat stabilizer, a photostabilizer, a flame retardant, carbon black, a pigment, an antioxidant, and the like may be added. Further, the prepared polyolefin may be used in combination with a linear low density polyolefin (LLDPE), a high density polyolefin (HDPE), polypropylene, a polybutene, an olefin/propylene (EP) rubber, and the like.

Advantageous Effects

According to the present invention, a method for preparing a catalyst that may exhibit high reactivity in the synthesis reaction of a polyolefin, and easily control properties of the synthesized polyolefin such as molecular weight distribution, mechanical properties, and the like, and a process for preparing a polyolefin using the same, are provided.

BRIEF DESCRIPTION OF DRAWINGS

FIG. 1 is an SEM (scanning electron microscope, SM-701, TOPCON Corporation) photograph of the catalyst of Example 1.

DETAILED DESCRIPTION OF THE EMBODIMENTS

The present invention will be explained in detail with reference to the following examples. However, these examples are only to illustrate the invention, and the scope of the invention is not limited thereto.

Example 1

Preparation of a Catalyst and Synthesis of Polyolefin

1) Preparation of a Magnesium Compound Solution

A 2 L pressure resistant glass reactor equipped with an agitator and an oil circulation heater was sufficiently ventilated with nitrogen, 36.2 g of anhydrous magnesium dichloride, 70.9 ml of 2,4-pentanediol, and 152 ml of decane were introduced under the nitrogen atmosphere, and the mixture was agitated at 130° C. at a rotation speed of 500 rpm. The magnesium compound was completed dissolved to produce a homogeneous solution and the solution was aged for 1 hour, and then 150.0 mol of benzoyl chloride was introduced for 30 minutes, the solution was aged at 130° C. for 1 hour, and the temperature of the reactor was lowered to 25° C. to prepare a magnesium compound solution.

2) Production of a Solid Support

A separate 3 L pressure resistant glass reactor equipped with an agitator and an oil circulation heater was sufficiently ventilated with nitrogen, 800 ml of hexane and 800 ml of titanium tetrachloride were introduced under nitrogen reflux, and the temperature of the reactor was lowered to −20° C. while agitating the mixture at 300 rpm to prepare a mixed solvent.

To the reactor where a titanium compound dispersed in a hexane solvent is introduced, the magnesium dichloride solution prepared in 1) was added over 4 hours.

After the magnesium compound solution was introduced and maintained for 1 hour, the temperature of the reactor was elevated to 20° C. at a speed of 0.25° C./min. After the temperature of the reactor reached 20° C., the solution was aged for 1 hour, the temperature of the reactor was elevated to 73° C. at a speed of 1° C./min. Further, after the temperature reached 73° C., the solution was aged for 2 hours, and a supernatant excluding a precipitated solid in the reactor was removed to produce a solid support.

3) Preparation of a Catalyst for Synthesis of Polyolefin

Into the solid support prepared in 2), 800 ml of titanium tetrachloride was introduced. The temperature was elevated at a speed 1° C./min with agitation, and 24 ml of diisobutylphtalate was introduced over 15 minutes at 110° C. The solution was aged for 1 hour to precipitate a solid catalyst again, and then the supernatant was removed. The supernatant-removed solid catalyst was further washed with titanium tetrachloride once, the temperature was lowered to 63° C., and it was washed with 1 L hexane 7 times to obtain a final solid catalyst slurry. The final catalyst slurry was dried with nitrogen to obtain a solid catalyst for synthesis of polyolefin.

4) Synthesis of Polyolefin

First, a 2 L nitrogen atmosphere heated to 120° C. was formed. Under the nitrogen atmosphere, the temperature of the reactor was lowered to 25° C., and the reactor was ventilated with propylene to maintain a propylene atmosphere. To the reactor maintained under propylene gas atmosphere, 2 mM of triethylaluminum that was diluted in a decane solvent to a concentration of 1 mole was introduced, and a cyclohexylmethyldimethoxysilane external electron donor that was diluted in a decane solvent was introduced so that the mole ratio of Si/Ti became 30. A catalyst diluted in a decane solvent was introduced in an amount of 0.005 g, 1000 ml of hydrogen was introduced, and then 500 g of propylene was introduced, and the agitator was operated to conduct prepolymerization for 5 minutes. After prepolymerization, the temperature of the reactor was heated to 70° C., polymerization was conducted at 70° C. for 1 hour, unreacted propylene was discharged in the air, and the temperature of the reactor was lowered to room temperature. Produced polypropylene was dried in a vacuum oven at 50° C. for 10 hours and then metered, apparent density and soluble xylene were measured, and the results are shown in the following Table 1.

Example 2

A catalyst was prepared and a polyolefin was synthesized by the same method as Example 1, except that 35.1 g of anhydrous magnesium dichloride, 80.6 ml of 3-methyl-2,4-pentanediol, 148 ml of decane, and 145.5 g of benzoyl chloride were introduced instead of 36.2 g of anhydrous magnesium dichloride, 70.9 ml of 2,4-pentanediol, 152 ml of decane, and 150.0 ml of benzoyl chloride.

Example 3

A catalyst was prepared and a polyolefin was synthesized by the same method as Example 1, except that 34.3 g of anhydrous magnesium dichloride, 87.8 ml of 3-ethyl-2,4-pentanediol, 144 ml of decane, and 142.2 g of benzoyl chloride were introduced instead of 36.2 g of anhydrous magnesium dichloride, 70.9 ml of 2,4-pentanediol, 152 ml of decane, and 150.0 ml of benzoyl chloride.

Comparative Example 1

A catalyst was prepared and a polyolefin was synthesized by the same method as Example 1, except that 37.4 g of anhydrous magnesium dichloride, 206.5 ml of 2-ethyl hexyl alcohol, 157 ml of decane, and 8.5 ml of phthaloyl dichloride were introduced instead of 36.2 g of anhydrous magnesium dichloride, 70.9 ml of 2,4-pentanediol, 152 ml of decane, and 150.0 ml of benzoyl chloride.

Comparative Example 2

A catalyst was prepared and a polyolefin was synthesized by the same method as Example 1, except that 39.3 g of anhydrous magnesium dichloride, 195.3 ml of 2-ethyl butyl alcohol, 165 ml of decane, and 8.9 ml of 1,2-phthaloyl dichloride were introduced instead of 36.2 g of anhydrous magnesium dichloride, 70.9 ml of 2,4-pentanediol, 152 ml of decane, and 150.0 ml of benzoyl chloride.

Experimental Example 11

Measurement of Physical Properties of Examples and Comparative Examples

In Examples 1 to 3, a benzoyl halide compound and an alkane diol were reacted, and in Comparative Examples 1 and 2, 1,2-phthaloyl dichloride and a primary alcohol were reacted instead of the benzoyl halide compound and the alkane diol.

As shown in Table 1, it was confirmed that the polymerization activity of the propylene obtained using the catalysts of Examples 1 to 3 that have smaller Ti content than Comparative Examples 1 and 2 was 45,000 g-PP/g-cat*h or more, and thus exhibit significantly higher polymerization activity compared to Comparative Examples 1 and 2. It was also confirmed that the polypropylene polymerized in Examples 1 and 2 exhibit stereoregularity of 99% or more, which is excellent compared to Comparative Examples 1 and 2. Further, in addition to polymerization activity and stereoregularity, other physical properties of the examples were equivalent to or excellent compared to the comparative examples, and thus it was confirmed that the catalyst for synthesis of polyolefin of Examples 1 to 3 improved performance of the previous catalyst.

Experimental Example 2

Kneading Process and Measurement of Physical Properties

In the kneading process, additives such as an oxidant, a heat stabilizer, a weather resistance stabilizer, an antistatic agent, a lubricant, a slipping agent, a flame retardant, a pigment, a dye, and the like can be used, and as the additives, those known to be used in a mixing process can be used without limitation. Specifically, an organic nucleating agent or an inorganic nucleating agent can be used, and the amount is preferably 0.05 to 0.5 wt %.

Particularly, it is preferable that organic metal nucleating agents such as aluminum para-tert-butylbenzoic acid, sodium benzoate, calcium benzoate, and the like are added in the content of 0.05 to 0.3 wt % based on 100 parts by weight of the polypropylene polymer, and that an inorganic nucleating agent such as talc is added in the content of 0.1 to 0.5 wt %. As the talc, talc having an average particle diameter of 1.0 μm and a maximum diameter of 5 μm may be preferably used, and if the diameter is 6 μm or more, the nucleating effect and operation efficiency may be lowered. Further, if the added amount of the nucleating agent is less than the above lower limit, it may be difficult to obtain sufficient stiffness and heat resistance, and if it is greater than the upper limit, effect improvement may not be further obtained.

The kneading may be conducted by commonly known methods without limitation, and the components and additives may be added in required amounts and mixed using a mixer such as a kneader, a roll, a Banbury mixer, and the like, and a single or twin screw and the like.

TABLE 1

|  | Example 1 | Example 2 | Example 3 | Comparative Example1 | Comparative Example2 |
|---|---|---|---|---|---|
| Ti content in catalyst components (%) | 1.8 | 1.9 | 2.1 | 2.2 | 2.4 |
| Catalyst particle size (μm) | 22 | 22 | 23 | 25 | 25 |
| Polymerization activity (g-PP/g-cat*hr) | 48,000 | 47,500 | 50,500 | 33,000 | 31,500 |
| Polypropylen apparent density (g/ml) | 0.46 | 0.46 | 0.46 | 0.45 | 0.45 |
| Stereoregularity (XIS) | 99.5 | 99.2 | 98.5 | 98.1 | 97.9 |

The resin and the additives were kneaded by the above method, and the physical properties of the examples and comparative examples were measured and are shown in the following Table 2.

TABLE 2

|  | Example 1 | Example 2 | Example 3 | Comparative Example1 | Comparative Example2 |
|---|---|---|---|---|---|
| MI (g/10 min) | 18 | 17 | 17 | 20 | 19 |
| Molecular weight distribution (MWD) | 5.5 | 5.6 | 5.4 | 5.0 | 5.2 |
| Transparency (Haze) | 7 | 7 | 9 | 11 | 13 |
| Flexural Modulus (FM) | 22,500 | 22,000 | 21,000 | 20,000 | 19,500 |
| Impact strength (Izod) | 2.5 | 2.5 | 2.5 | 2.6 | 2.6 |
| Heat deflection temperature (HDT) | 145 | 145 | 144 | 143 | 141 |

* MI (Melt flow index): measured at 230° C., under a load of 2.16 kg, according to ASTM D1238.
* Molecular weight distribution: the ratio of weight average molecular weight (Mw) and number average molecular weight (Mn) measured by gel permeation chromatography (GPC) (Mw/Mn).
* Transparency (haze): Transparency of the plastic molded specimen sheet is evaluated as a haze value, and the haze value is measured according to ASTM D1003.
* Flexural modulus: The resin composition of the present invention is manufactured into a specimen and then the flexural modulus is measured according to ASTM 790.
* Impact strength: The resin composition of the present invention is manufactured into a specimen in a pellet state and then the impact strength is measured according to ASTM D256.
* Heat deflection temperature (HDT): The resin composition of the present invention is manufactured into a specimen in a pellet state and then the heat deflection temperature is measured according to ASTM D648.

As shown in the Table 2, it was confirmed that Examples 1 to 3 have wide molecular weight distributions compared to Comparative Examples 1 and 2, and exhibit low haze values and thus have increased transparency compared to the comparative examples. Further, it was confirmed that Examples 1 to 3 have excellent flexural modulus and heat deflection temperature compared to Comparative Examples 1 to 2, and thus they are expected to be widely used as outer parts compared to the existing polyolefin resin. Furthermore, it was confirmed that other physical properties of the polymerization products obtained in the examples are equivalent to or excellent compared to the comparative examples.

In addition, as shown in the SEM photograph of FIG. 1, the catalyst for synthesis of polyethylene of Example 1 has a regular spherical shape and a smooth surface.

The invention claimed is:

1. A method for preparing a catalyst for synthesis of a polyolefin, comprising:
    reacting a magnesium compound with an alkane diol having a carbon number of 3 to 15 and unsubstituted or substituted with an alkyl group having a carbon number of 1 to 5, and a benzoyl halide compound to prepare a magnesium compound solution;
    reacting the magnesium compound solution with a first transition metal compound to prepare a support; and
    reacting the support with a second transition metal compound to produce a solid catalyst.

2. The method for preparing a catalyst for synthesis of a polyolefin according to claim 1,
    wherein the first and the second transition metal compounds respectively comprise a compound of the following Chemical Formula 1:

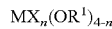

$MX_n(OR^1)_{4-n}$  [Chemical Formula 1]

wherein, in Chemical Formula 1, M is selected from the group consisting of transition metal atoms of Groups IVB, VB, and VIB in the periodic table,
    X is a halogen,
    $R^1$ is an alkyl group having a carbon number of 1 to 10, and
    n is 0 to 4.

3. The method for preparing a catalyst for synthesis of a polyolefin according to claim 1, wherein the reaction molar ratio of the magnesium compound and the benzoyl halide compound is 1:0.03 to 1:3.

4. The method for preparing a catalyst for synthesis of a polyolefin according to claim 1, wherein a reaction molar ratio of the magnesium compound and the alkane diol having a carbon number of 3 to 15 unsubstituted or substituted with an alkyl group having a carbon number of 1 to 5 is 1:1 to 1:10.

5. The method for preparing a catalyst for synthesis of a polyolefin according to claim 1, wherein the step of preparing the magnesium compound solution is conducted at a temperature of 70 to 150° C.

6. The method for preparing a catalyst for synthesis of a polyolefin according to claim 1, wherein the step of preparing the magnesium compound solution is conducted in the presence of a hydrocarbon solvent.

7. The method for preparing a catalyst for synthesis of a polyolefin according to claim 6, wherein a reaction molar ratio of the alkane diol having a carbon number of 3 to 15 unsubstituted or substituted with an alkyl group having a carbon number of 1 to 5 and the hydrocarbon solvent is 1:0.2 to 1:2.

8. The method for preparing a catalyst for synthesis of a polyolefin according to claim 1, wherein the step of reacting the magnesium compound solution with the first transition metal compound to prepare a support comprises dispersing the first transition metal compound in a hydrocarbon solvent and reacting it with the magnesium compound solution.

9. The method for preparing a catalyst for synthesis of a polyolefin according to claim 8, wherein the step of dispersing the first transition metal compound in a hydrocarbon solvent and reacting it with the magnesium compound is conducted at a temperature of −50 to 20° C.

10. The method for preparing a catalyst for synthesis of a polyolefin according to claim 1, wherein the step of reacting the magnesium compound solution with the first transition metal compound to prepare a support further comprises a step of heating the solution obtained by reacting the magnesium compound solution with the first transition metal compound.

11. The method for preparing a catalyst for synthesis of a polyolefin according to claim 1, wherein each step of preparing a magnesium compound solution, preparing a support, and producing the solid catalyst further comprises a step of adding an electronic donor.

12. The method for preparing a catalyst for synthesis of a polyolefin according to claim 11, wherein in the step of producing a solid catalyst, the reaction molar ratio of the magnesium compound solution and the electronic donor is 1:0.01 to 1:2.

13. The method for preparing a catalyst for polymerization of a polyolefin according to claim 1, wherein the step of producing a solid catalyst is conducted at a temperature of 80 to 130° C.

14. A process for synthesis of a polyolefin comprising reacting olefin monomers in the presence of a catalyst prepared by the process for preparing a catalyst for synthesis of a polyolefin according to claim 1.

15. The process for synthesis of a polyolefin according to claim 14, wherein the olefin monomers include at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, and 3-chloromethylstyrene.

\* \* \* \* \*